(12) United States Patent
Qian et al.

(10) Patent No.: US 8,099,000 B2
(45) Date of Patent: Jan. 17, 2012

(54) DIRECT DETECTION RECEIVER USING CROSS-POLARIZATION INTERFEROMETER FOR POLMUX-ASK SYSTEM

(75) Inventors: Dayou Qian, Plainsboro, NJ (US); Ting Wang, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 401 days.

(21) Appl. No.: 12/398,510

(22) Filed: Mar. 5, 2009

(65) Prior Publication Data

US 2009/0310966 A1    Dec. 17, 2009

Related U.S. Application Data

(60) Provisional application No. 61/060,702, filed on Jun. 11, 2008.

(51) Int. Cl.
*H04B 10/06* (2006.01)
(52) U.S. Cl. .................................................. 398/212
(58) Field of Classification Search .............. 356/519; 359/484.07
See application file for complete search history.

(56) References Cited

U.S. PATENT DOCUMENTS

| 7,076,169 | B2 * | 7/2006 | Shpantzer et al. | 398/76 |
| 7,515,832 | B2 * | 4/2009 | Kikuchi | 398/161 |
| 2006/0024064 | A1 * | 2/2006 | Hecker et al. | 398/152 |
| 2007/0025737 | A1 * | 2/2007 | Kamio et al. | 398/150 |

* cited by examiner

*Primary Examiner* — Jessica Stultz
*Assistant Examiner* — Tuan Nguyen
(74) *Attorney, Agent, or Firm* — James Bitetto; Joseph Kolodka

(57) ABSTRACT

A differential delay detection system and method includes an optical splitter to split an incoming optical signal between a first path and a second path. The first path includes a cross-polarization interferometer configured to separately generate polarization independent outputs using split paths and to generate cross-polarization interference outputs, balanced photodetectors to aid in removing cross-polarization beating noise, and a polarization demultiplexer configured to combine the polarization independent outputs and the cross-polarization interference outputs from the cross-polarization interferometer with updated coefficients received from the second path to remove the cross-polarization mixed signals. The second path includes a training signal receiver configured to compute the updated coefficients and output the updated coefficients to the polarization demultiplexer.

13 Claims, 7 Drawing Sheets

DIRECT DETECTION RECEIVER USING CROSS-POLARIZATION INTERFEROMETER FOR POLMUX-ASK SYSTEM

RELATED APPLICATION INFORMATION

This application claims priority to provisional application Ser. No. 61/060,702 filed on Jun. 11, 2008, incorporated herein by reference.

BACKGROUND

1. Technical Field

The present invention relates to optical communications systems, and more particularly to an apparatus and a method for using cross-polarization interferometry in a direct-detection, polarization-multiplexing receiver.

2. Description of the Related Art

Coherent light may be transmitted in two orthogonal polarizations, where polarization refers to the orientations and relative phases of the electric and magnetic fields that make up the light. Light can be filtered through a polarizer, so that only those photons which have their electric fields along, for instance, a horizontal plane, may pass through. The result is that signals of two different polarizations (e.g., vertically polarized and horizontally polarized) may be transmitted along the same medium without interfering. The signals can then be split through the use of birefringent materials, which have different indices of refraction for light of different polarizations.

As the demand for data capacity in high-speed optical transmission systems increases, spectral efficiency (SE, the amount of information which can be transmitted over a given bandwidth) is becoming increasingly important. To achieve high SE, polarization multiplexing (PolMux) is a key technology because it can smoothly work with any modulation formats and can easily double the spectral efficiency from the original SE of the modulation format without PolMux. PolMux accomplishes this by transmitting completely separate signals at the same wavelength, each signal having a polarization that is orthogonal to the other.

For PolMux Amplitude Shift Keying (ASK) systems, data is carried by the amplitude of the optical signals on orthogonal polarizations. The signals are combined by a polarization beam combiner (PBC) at the transmitter. At the receiver, the combined optical signals are separated by a polarization beam splitter (PBS) into two orthogonally polarized, optical signals.

An obstacle to this process is the fact that polarization does not remain constant in optical fibers. As a signal travels through the fiber, its polarization rotates Because of this effect, the alignment between the PBS and PBC is not guaranteed. Each output of the PBS would be a combined signal from both inputs of the PBC, such that the original signals cannot be immediately extracted. In addition, a crossing-polarization beating noise will be generated between the two signals. Coherent detection is currently the only option at the receiver side which can minimize the crossing-polarization beating noise.

However, the coherent detection receiver has drawbacks; both frequency offset and phase offset need to be removed by digital processing which requires large power consumption and complicated system design. Coherent detection also requires a spare narrow line-width laser at the receiver as the local oscillator, which can increase both system cost and complexity.

A direct-detection receiver can overcome all of the above issues. There is no frequency offset or phase offset transmitted with the received signal, and a local oscillator laser is not required. However, to realize direct-detection for PolMux-ASK signals, the crossing-polarization beating noise has to be eliminated or avoided before the signal can be correctly detected. The same direct-detection receiver can also work with any other amplitude modulation (AM) systems with PolMux, for example, Quadrature Amplitude Modulation (QAM), On-Off Keying (OOK), etc.

SUMMARY

A differential delay detection system and method includes a cross-polarization interferometer which receives a polarization multiplexed input signal and is configured to separately generate polarization independent outputs using split paths and to generate cross-polarization interference outputs, balanced photodetectors which filter the output of the cross-polarization interferometer, a training signal receiver which receives the input signal and which is configured to extract a training signal from the input signal and generate updated coefficients representing a rotation of the input's polarization, and a polarization demultiplexer configured to combine the polarization independent outputs and the cross-polarization interference outputs from the cross-polarization interferometer, after they have been filtered by the balanced photodetectors, with the updated coefficients received from the training signal receiver to extract an original, unrotated signal.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide differential delay detection for polarization multiplexing (PolMux) systems, and in particular for PolMux-amplitude shift keying (ASK) systems. The differential delay detection can simplify a receiver design, improve system reliability and reduce cost by simplifying signal processing for a frequency offset and a phase offset and removing an expensive narrow line-width local oscillator laser.

Through simulation, it has been proven that the cross-delay differential detection in accordance with the present principles can recover polarization rotation very well. As such, PolMux-ASK systems can benefit from using cross-delay differential detection instead of coherent detection, resulting in lower cost and complexity. In accordance with an illustrative embodiment, a 4-path butterfly cross-polarization differential delay (Mach-Zehnder) interferometer is employed to process the differential detection when signals are transmitted at two orthogonal polarizations. Two additional cross-polarization differential delay outputs can help to remove the cross-polarization mixed signals generated by the necessarily random split of the polarized signals at the receiver.

Embodiments described herein may be entirely hardware, entirely software or including both hardware and software elements. In a preferred embodiment, the present invention is implemented in hardware but may include software components, which may include but are not limited to firmware, resident software, microcode, etc.

Figure 1:
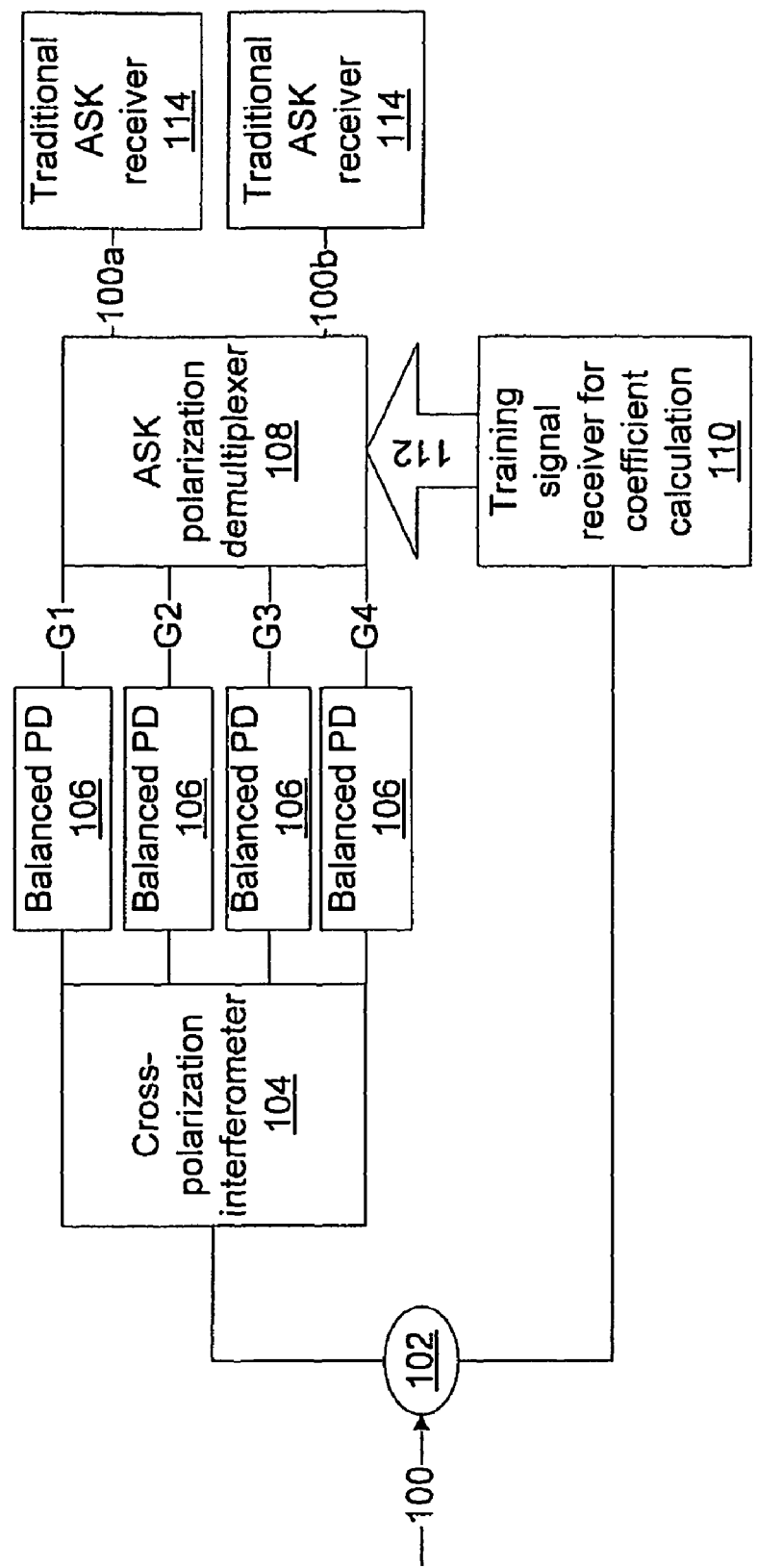
FIG. 1 is a block diagram showing a direct detection receiver for a polarization multiplexing, amplitude signal keying (ASK) system.

Referring now in detail to the figures in which like numerals represent the same or similar elements and initially to FIG. 1, an exemplary system is shown which receives PolMux-ASK signals. The incoming beam 100 is split by a non-polarizing beam splitter 102. One signal is used as a training signal for determining coefficients 112 at block 110 which will allow recovery of the polarizations (described in greater detail below). The other signal serves as input to a cross-polarization interferometer 104.

Figure 2:
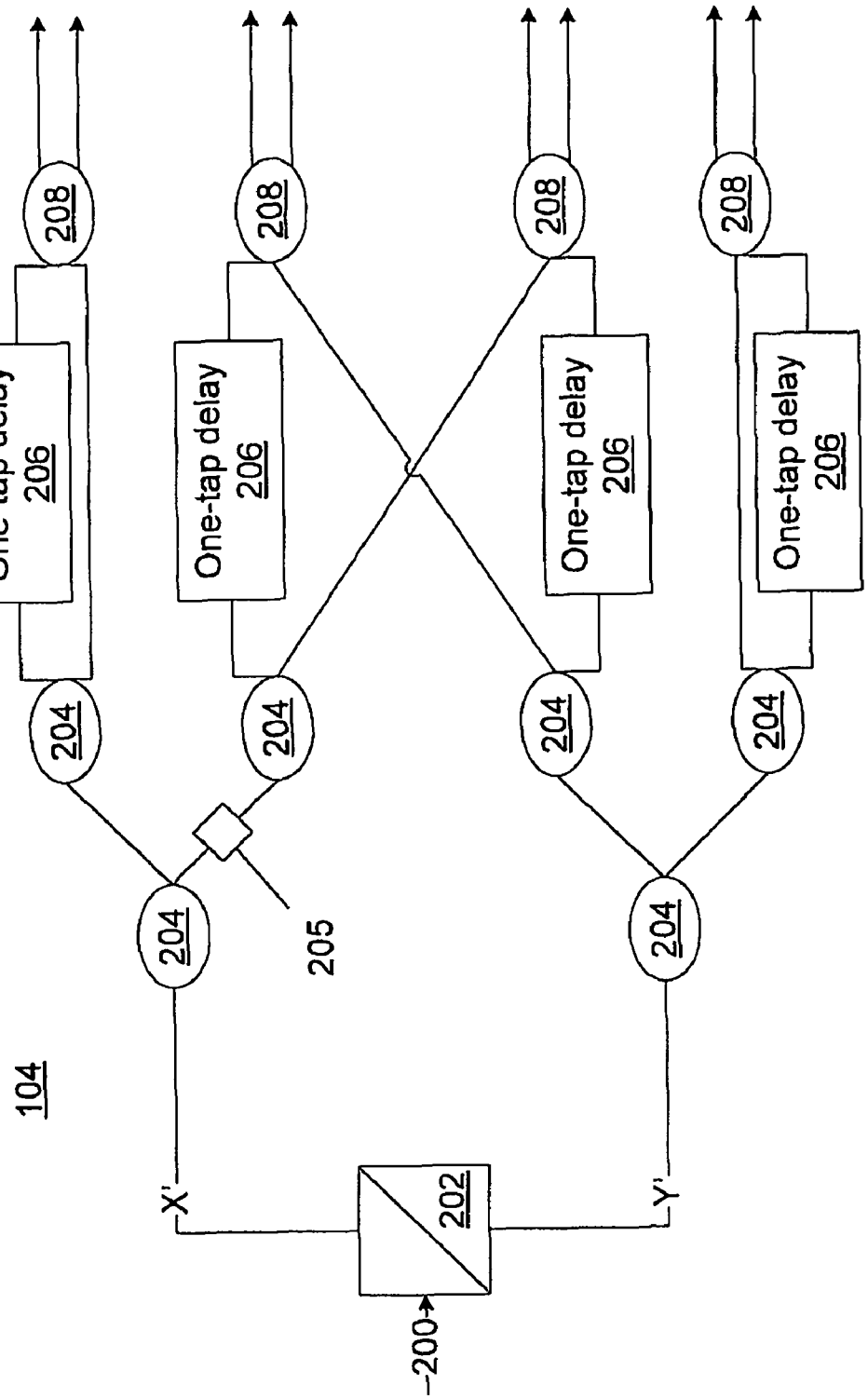
FIG. 2 is a block diagram showing detail on the cross-polarization interferometer.

The cross-polarization interferometer produces four output optical signal pairs. These pairs comprise two versions of each interfered combination, one delayed with respect to the other. For the sake of simplicity, FIG. 1 only shows four signals leaving the cross-polarization interferometer. FIG. 2, shows that the four output signals depicted in FIG. 1 are each made up of two separate signals.

The signals from the interferometer include additional, unnecessary information which is referred to as the cross-polarization beating noise. This noise is removed at the balanced photodetectors 106. Each photodetector 106 takes an optical signal pair as inputs, and produces an electrical signal G1-G4 with the cross-polarization beating noise removed. The photodetectors 106 accomplish this by outputting the difference in power between the pair of signals.

The signals G1-G4 then enter the polarization demultiplexer 108, which uses the coefficients 112 produced by block 110 to reconstruct the original polarized signals 100a and 100b. Training signals are periodically sent containing a distinctive sequence of symbols. These training signals allow for the calculation of updated coefficients 112 responsive to changing transmission conditions as described below and shown in FIG. 7. Each of the signals 100a and 100b is then sent to a traditional ASK receiver 114.

Referring now to FIG. 2, an exemplary cross-polarization interferometer 104 is shown. The input signal 200 is split in a polarizing beam splitter (PBS) 202, producing two polarized signals, X' and Y'. The polarization orientation of PBS 202 is arbitrary, because the polarization of the original signal will have rotated by an unknown amount. The two polarized signals X' and Y' are then split again in beam splitters 204. One X' signal is rotated by 902 in polarization controller 205, producing an X' signal with the same polarization as Y'. Each of the four signals is then split again and analyzed using delay differential interferometry. The interferometer uses one-tap delays 206 to delay signals with respect to one another. These delays can be any duration as long as the duration of the ASK symbols is an integer multiple of the delay duration. For best performance, the delay should be equal to or less than one quarter of the ASK symbol duration. The delays should additionally maintain wavelength level synchronization.

In the interferometer 104, one X' signal is interfered with a delayed version of itself, and similarly one Y' signal is interfered with a delayed version of itself. Then one rotated X' signal is interfered with a delayed Y' signal and one Y' signal is interfered with a delayed, rotated X' signal. The interference takes place at polarization-maintaining beam combiners 208, producing four output signals, G1-G4.

Figure 3:
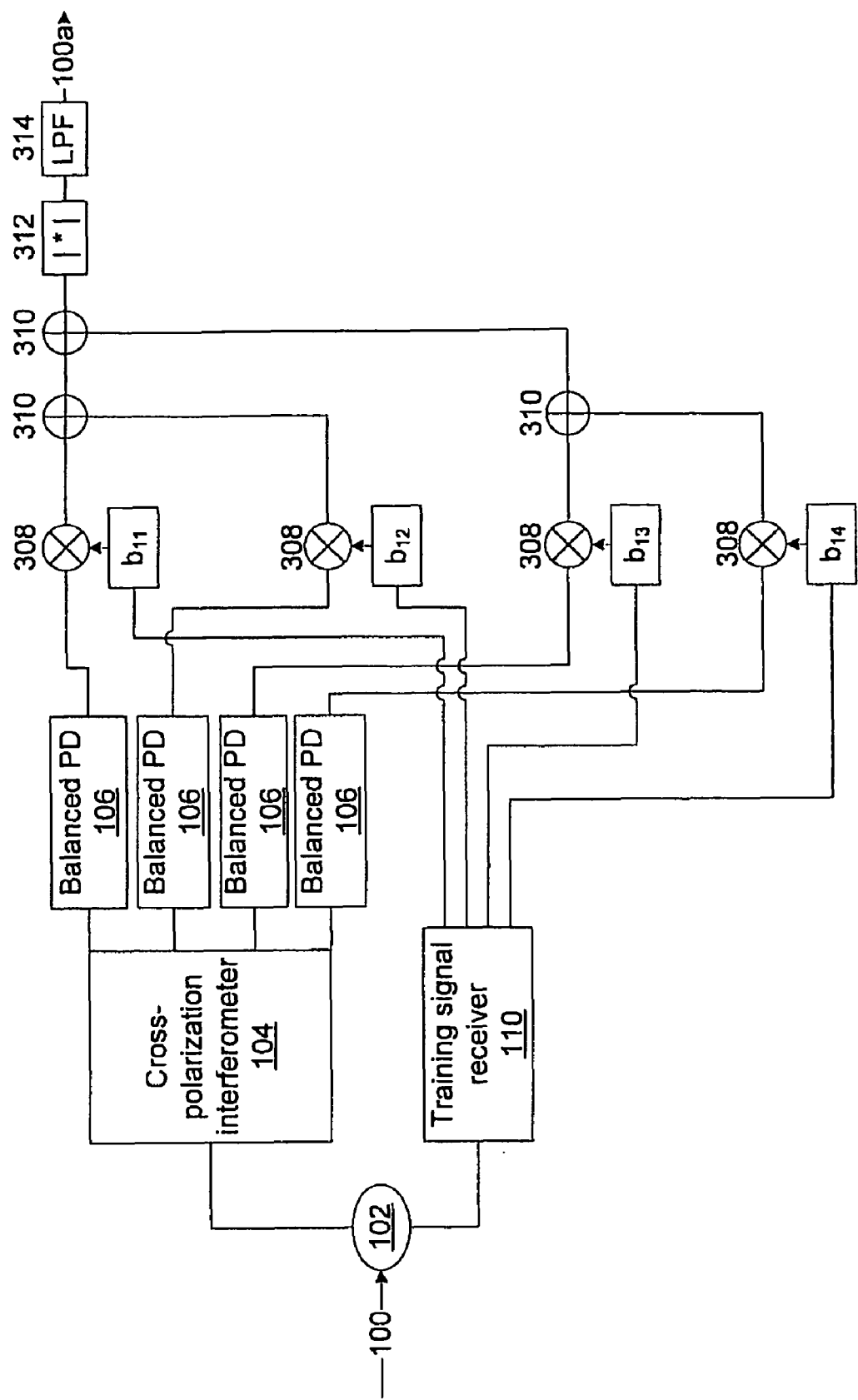
FIG. 3 is a block diagram showing detail on the ASK polarization demultiplexer.
Figure 7:
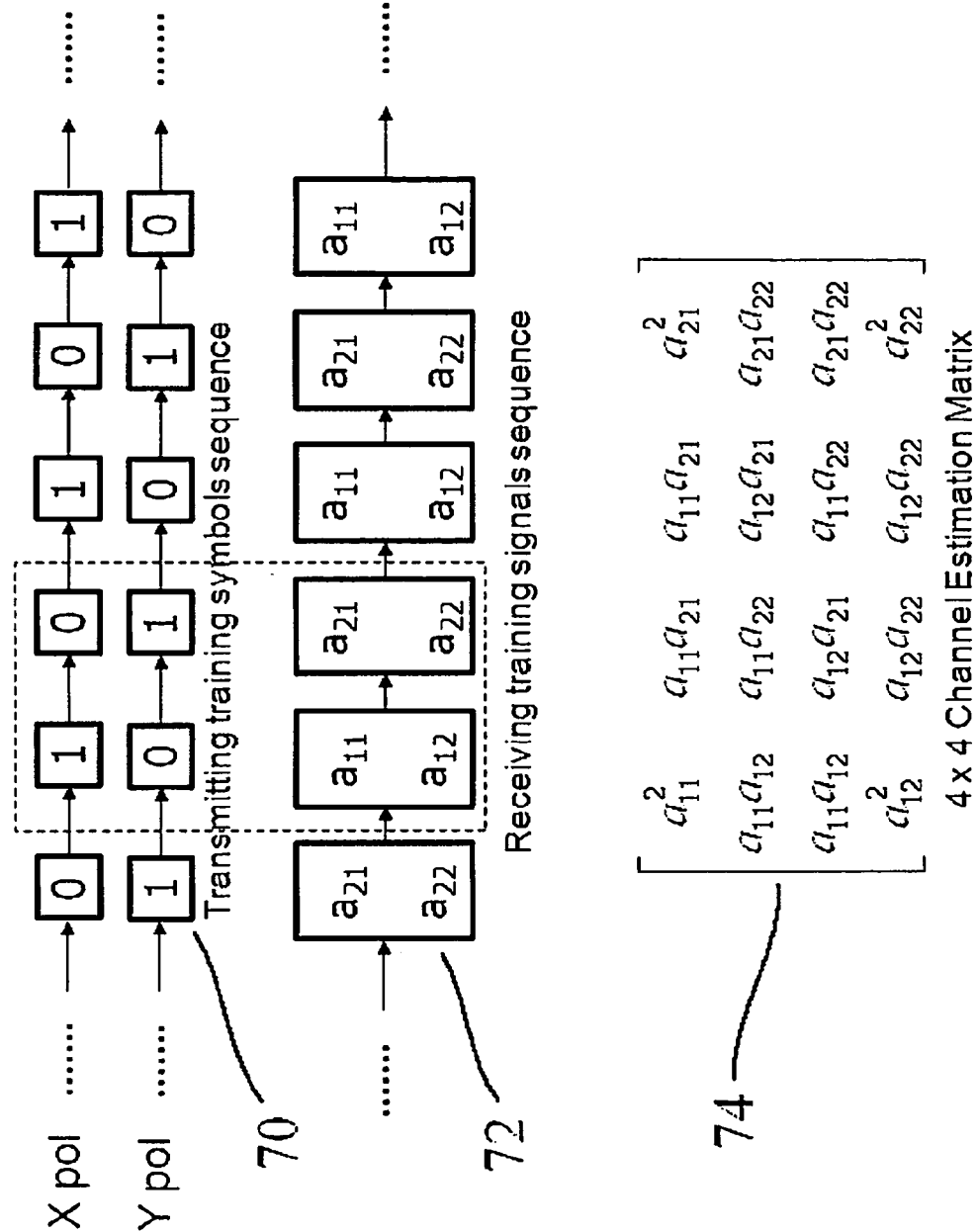
FIG. 7 shows an example rotation matrix used to calculate coefficients for extracting ASK signals from polarization interference signals.

FIG. 3 shows greater detail on an exemplary ASK polarization demultiplexer 108. Each of the outputs from the cross-polarization interferometer 104 passes through a balanced photodetector 106. Each output is then multiplied in multipliers 308 by a coefficient calculated in training signal receiver 110. The training signal receiver 110 calculates the coefficients $b_{11}$–$b_{14}$ using a low-speed analog-to-digital converter and digital signal processing, as described below and as shown in FIG. 7. The four signals are then combined in adders 310 to produce a single signal. By taking the absolute value 312 of the sum signal and passing it through a low pass filter 314, the original ASK signal on one of the polarizations is produced as signal 100a. The same technique, using different coefficients, can be used to extract the orthogonal ASK signal and output it as signal 100b. In this manner, both of the original ASK signals, having been transmitted on a common medium using orthogonal polarizations, can be recovered.

Figure 4:
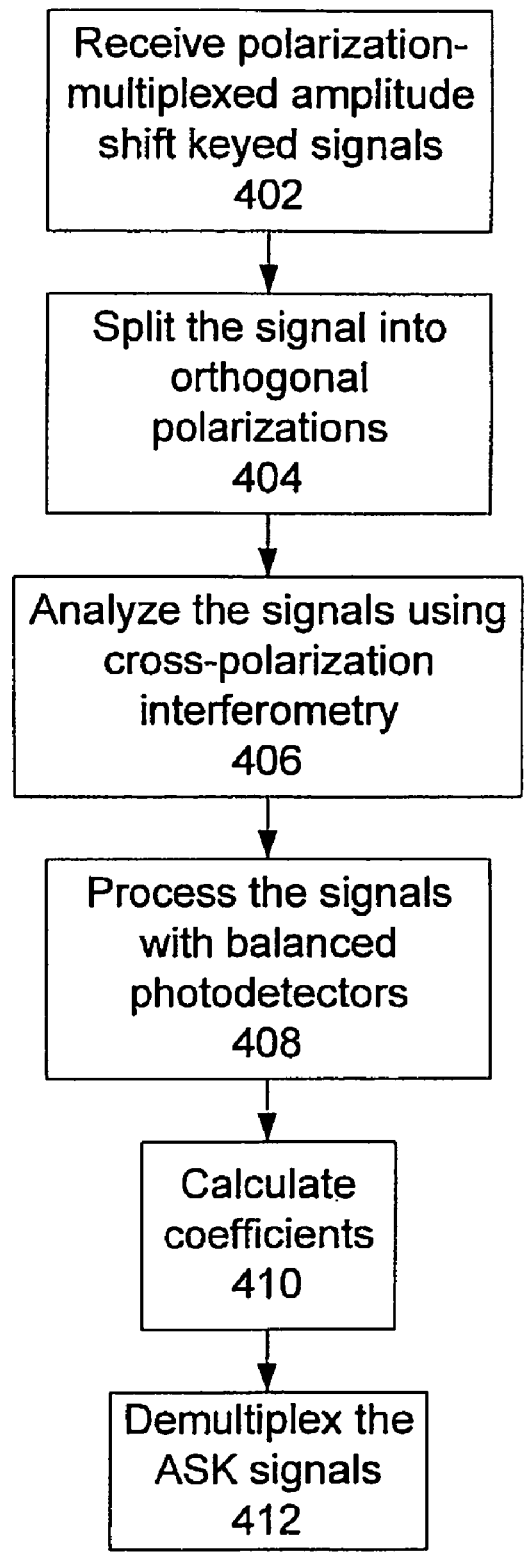
FIG. 4 is a block/flow diagram showing a method by which polarization multiplexed optical signals can be received.

FIG. 4 illustrates a method for demultiplexing polarization-multiplexed ASK signals. The incoming signal is received at block 402. The signal is then split into orthogonal polarizations at block 404. As noted above, the particular axes used to split the signals into orthogonal polarizations are arbitrary. The signals are then processed using balanced photodetectors at block 408. The interferometry and photodetector steps serve to eliminate the cross-polarization beating noise. Block 410 calculates the coefficients which allow the extraction of the ASK signals from the arbitrarily polarized signals. The final demultiplexing takes place at block 412, after which the signals can be interpreted using traditional ASK receivers. As a result, two separate ASK signals may be received using a shared frequency, effectively doubling the throughput.

Figure 5:
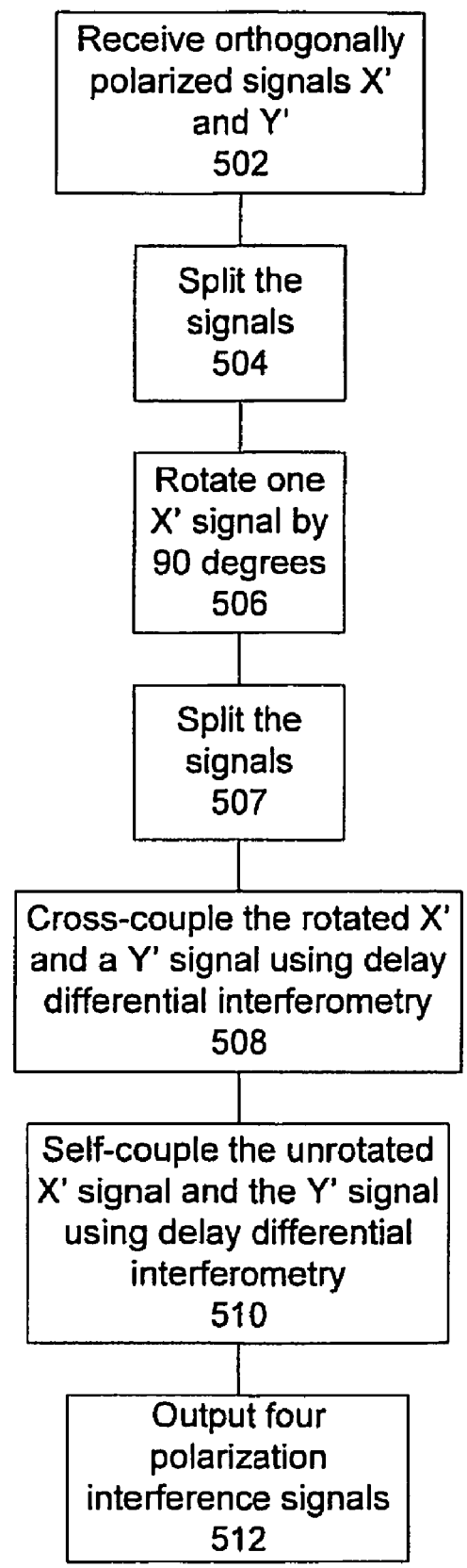
FIG. 5 is a block/flow diagram showing a method for cross-polarization interferometry.

FIG. 5 illustrates a method for cross-polarization interferometry. At block 502, two signals (X' and Y') are received having orthogonal polarizations. Each signal is split in block 504, and one of the X' signals is rotated by ninety degrees in block 506. The four signals are then further split in block 507. The rotated X' signal and one of the Y' signals are then cross-coupled in block 508, each being added to a delayed version of the other. This cross-coupling allows recapture of the polarization information stored in the interfered signals. The unrotated X' signal and the remaining Y' signal are then self-coupled to a delayed version of themselves in block 510 to produce polarization independent signals. The four resultant polarization interference signals are then output at block 512.

Figure 6:
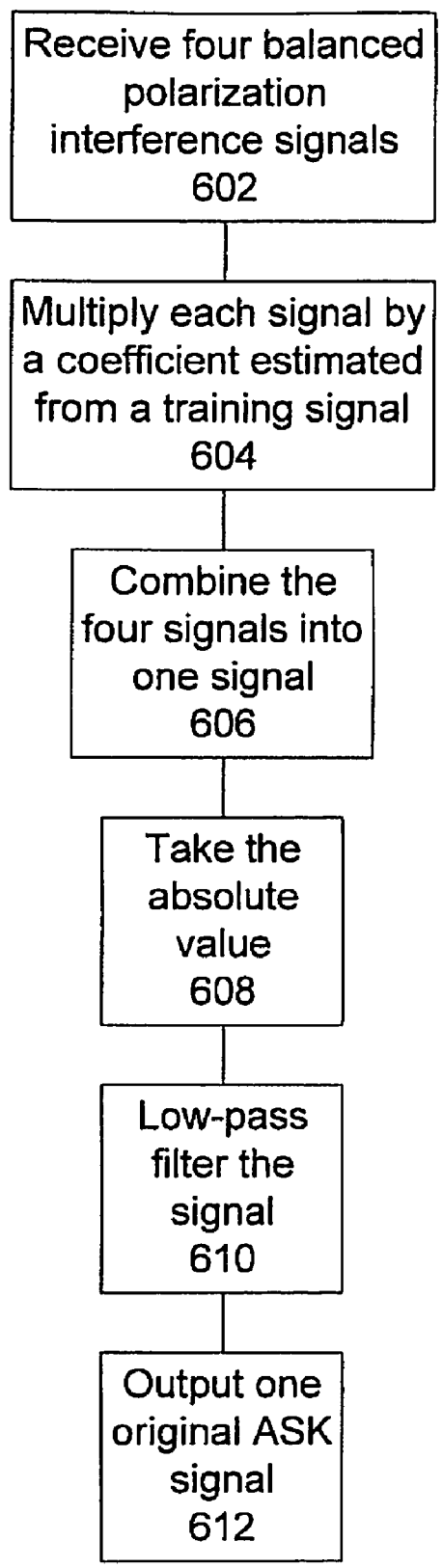
FIG. 6 is a block/flow diagram showing a method for extracting an original ASK signal from four polarization interference signals.

FIG. 6 illustrates a method for extracting an original ASK signal from four polarization interference signals. At block 602, the four signals are received as input. Each signal is then multiplied by a coefficient estimated from a training signal at block 604. The procedure for calculating said coefficients is described below and shown in FIG. 7. The signals are then added together at block 606. Block 608 then takes the absolute value of the summed signal. The signal is then low-pass filtered at block 610. The signal is then output as one of the original ASK signals in block 612—the particular coefficients used in block 604 determine which of the two original signals is output.

Referring to FIG. 7, an example of transmitting signal sequences 70 and receiving training signal sequences 72 is illustratively depicted along with a 4×4 channel estimation matrix 74. The example of FIG. 7 uses a 2-level ASK scheme, which can encode one bit with every symbol, but higher-order schemes which can encode more bits per symbol are also contemplated. There are two different training signals (X pol:0,1; Y pol:1,0) transmitted periodically. Upon receiving the training signals, a 4×4 channel estimation matrix 74 will be estimated using the latest set of training signals ($a_{11}$, $a_{21}$, $a_{12}$, and $a_{22}$) with the previous set. Then, the coefficients for polarization demultiplexing can be updated by finding the inverse matrix of the 4×4 channel estimation matrix 74. The ASK polarization demultiplexer 108 uses updated coefficients 110 to recover the received signals back to the ASK signal which can be detected directly by a traditional ASK receiver 114. The ASK polarization demultiplexing can be performed with either digital or analog signal processing.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A differential delay detection system, comprising:
a cross-polarization interferometer which receives a polarization multiplexed input signal and is configured to separately generate polarization independent outputs using split paths and to generate cross-polarization interference outputs;
balanced photodetectors which filter the outputs of the cross-polarization interferometer;
a training signal receiver which receives the input signal and which is configured to extract a training signal from the input signal and generate updated coefficients representing a rotation of the input's polarization; and
a polarization demultiplexer configured to combine the polarization independent outputs and the cross-polarization interference outputs from the cross-polarization interferometer, after they have been filtered by the balanced photodetectors, with the updated coefficients received from the training signal receiver to extract an original, unrotated signal;
wherein the cross-polarization interferometer includes a polarization beam splitter to split an incoming optical signal into a first polarization signal and a second polarization signal;
wherein the first and second polarization signal are further split and the cross-polarization interferometer further comprises a polarization controller configured to rotate a split version of the first polarization signal by 90 degrees to form a rotated version of the first polarization signal; and
wherein a split version of the second polarization signal and the rotated version are cross-coupled with one tap delays to output the cross-polarization interference outputs.

2. The system as recited in claim 1, wherein a split version of the first polarization signal is combined with a one tap delay version of itself and a split version of the second polarization signal is combined with a one tap delay version of itself to provide the polarization independent outputs.

3. The system as recited in claim 1, wherein the polarization demultiplexer includes multipliers to multiply the updated coefficients with one of the polarization independent outputs and the cross-polarization interference outputs.

4. The system as recited in claim 3, wherein the polarization demultiplexer includes adders to add product outputs of the multipliers.

5. The system as recited in claim 1, wherein the incoming signal is modulated using amplitude shift keying (ASK) and the polarization demultiplexer outputs to an ASK receiver.

6. The system as recited in claim 1, wherein the balanced photodetectors remove a cross-polarization beating noise.

7. A method for differential delay detection comprising:
receiving a polarization multiplexed input signal;
generating polarization independent outputs and cross polarization interference outputs from the input signal using split paths in a cross-polarization interferometer;
filtering the outputs using balanced photodetectors;
extracting a training signal from the input signal and computing updated coefficients representing a rotation of the inputs polarization using a training signal receiver;
polarization demultiplexing the polarization independent outputs and the cross-polarization interference outputs after they have been filtered to combine with the updated coefficients received from the training signal receiver to obtain an original, unrotated signal;
splitting the incoming optical signal in the first path into a first polarization signal and a second polarization signal;
further splitting the first and second polarization signals; and rotating a split version of the first polarization signal by 90 degrees to form a rotated version of the first polarization signal; and
cross-coupling a split version of the second polarization signal and the rotated version with one tap delays to output the cross-polarization interference outputs.

8. The system as recited in claim 7, further comprising:
combining a split version of the first polarization signal with a one tap delay version of itself, and combining a split version of the second polarization signal with a one tap delay version of itself to provide the polarization independent outputs.

9. The method as recited in claim 7, further comprising:
multiplying the updated coefficients with one of the polarization independent outputs and the cross-polarization interference outputs by the polarization demultiplexer.

10. The method as recited in claim 9, further comprising: adding product outputs of the multipliers by the polarization demultiplexer.

11. The method as recited in claim 7, wherein the incoming signal is modulated using amplitude shift keying (ASK) and the polarization demultiplexer outputs to an ASK receiver.

12. The method as recited in claim 7, wherein the filtering removes a cross-polarization beating noise.

13. A method for differential delay detection comprising:
receiving a polarization multiplexed input signal;
generating polarization independent outputs and cross polarization interference outputs from the input signal using split paths in a cross-polarization interferometer;
filtering the outputs using balanced photodetectors;
extracting a training signal from the input signal and computing updated coefficients representing a rotation of the inputs polarization using a training signal receiver;
polarization demultiplexing the polarization independent outputs and the cross-polarization interference outputs after they have been filtered to combine with the updated coefficients received from the training signal receiver to obtain an original, unrotated signal;

splitting the incoming optical signal in the first path into a first polarization signal and a second polarization signal;

further splitting the first and second polarization signals and rotating a split version of the first polarization signal by 90 degrees to form a rotated version of the first polarization signal; and combining a split version of the first polarization signal with a one tap delay version of itself, and combining a split version of the second polarization signal with a one tap delay version of itself to provide the polarization independent outputs.

* * * * *